(12) United States Patent
Franck et al.

(10) Patent No.: US 7,121,515 B2
(45) Date of Patent: Oct. 17, 2006

(54) REDETACHABLE DEVICE

(75) Inventors: Achim Franck, Hamburg (DE);
Andreas Junghans, Hamburg (DE);
Bernd Lühmann, Norderstedt (DE);
Thorsten Krawinkel, Hamburg (DE)

(73) Assignee: tesa AG, Hamburg (DE)

( * ) Notice: Subject to any disclaimer, the term of this patent is extended or adjusted under 35 U.S.C. 154(b) by 195 days.

(21) Appl. No.: 10/014,484

(22) Filed: Dec. 11, 2001

(65) Prior Publication Data

US 2002/0112823 A1    Aug. 22, 2002

(30) Foreign Application Priority Data

Dec. 21, 2000  (DE) ................. 100 63 854

(51) Int. Cl.
*C09J 7/02*    (2006.01)

(52) U.S. Cl. ............. 248/205.3; 248/301; 248/304; 248/467; 248/683; 428/40.1; 428/41.3; 428/41.8; 428/42.1; 428/100; 428/194; 428/343

(58) Field of Classification Search ........... 248/205.3, 248/301, 304, 467, 683; 428/40.1, 41.3, 428/41.8, 42.1, 100, 194, 343
See application file for complete search history.

(56) References Cited

U.S. PATENT DOCUMENTS

| | | | |
|---|---|---|---|
| 4,024,312 A | 5/1977 | Korpmann | 428/343 |
| 5,409,189 A | 4/1995 | Lühmann et al. | 248/205.3 |
| 5,491,012 A | 2/1996 | Lühmann et al. | 428/40 |
| 5,507,464 A | 4/1996 | Hamerski et al. | 248/683 |
| 5,626,931 A | 5/1997 | Lühmann et al. | 428/40.1 |
| 5,626,932 A | 5/1997 | Lühmann et al. | 428/40.1 |
| 5,672,402 A | 9/1997 | Kreckel et al. | 428/34.2 |
| 5,897,949 A | 4/1999 | Lühmann et al. | 428/317.3 |
| 5,928,747 A | 7/1999 | Luhmann et al. | 428/40.1 |
| 6,004,665 A | 12/1999 | Lühmann et al. | 428/317.3 |
| 6,086,973 A | 7/2000 | Hazes | |
| 6,106,953 A | 8/2000 | Zimmermann | |
| 6,136,397 A | 10/2000 | Lühmann et al. | 428/40.1 |
| 6,245,177 B1 | 6/2001 | Lühmann et al. | 156/182 |
| 6,284,378 B1 | 9/2001 | Junghans et al. | 428/421 |

FOREIGN PATENT DOCUMENTS

| | | |
|---|---|---|
| DE | 33 31 016 C2 | 10/1984 |
| DE | 42 33 872 C2 | 3/1994 |
| DE | 44 28 587 C2 | 2/1996 |
| DE | 44 31 914 C2 | 3/1996 |
| DE | 195 11 288 C2 | 10/1996 |

(Continued)

OTHER PUBLICATIONS

U.S. Appl. No. 09/073,509, filed May 6, 1998.

(Continued)

*Primary Examiner*—Daniel Zirker
(74) *Attorney, Agent, or Firm*—Norris McLaughlin & Marcus PA

(57) ABSTRACT

A redetachable self-adhesive device
 a) whose reverse face is bonded with a strip of a double-sidedly adhering adhesive sheet in such a way that one end of the adhesive sheet projects beyond the device as a grip tab,
 b) the adhesive sheet is such that the bond made with it is redetachable by stretching pulling on the grip tab of the strip in the direction of the bond plane,
 wherein
 c) on its reverse face (2) the device (1), in the region (3A, 3B) situated against the grip tab (6) of the adhesive sheet strip (5) or and also partly against the free adhesive composition, has an average roughness $R_a$ of 0.4–25 µm.

9 Claims, 1 Drawing Sheet

FOREIGN PATENT DOCUMENTS

| | | |
|---|---|---|
| DE | 195 31 696 A1 | 3/1997 |
| DE | 296 23 112 U1 | 12/1997 |
| DE | 197 08 366 A1 | 1/1998 |
| DE | 197 29 706 A1 | 3/1998 |
| DE | 196 37 223 A1 | 4/1998 |
| DE | 196 49 636 A1 | 6/1998 |
| DE | 196 49 727 A1 | 6/1998 |
| DE | 196 49 728 A1 | 6/1998 |
| DE | 196 49 729 A1 | 6/1998 |
| DE | 297 23 198 U1 | 10/1998 |
| DE | 197 20 145 A1 | 11/1998 |
| DE | 197 23 177 A1 | 12/1998 |
| DE | 198 13 081 A1 | 1/1999 |
| DE | 197 56 816 C1 | 2/1999 |
| DE | 297 23 614 U1 | 3/1999 |
| DE | 197 56 084 A1 | 7/1999 |
| DE | 42 22 849 C2 | 2/2000 |
| EP | 0 832 588 A1 | 4/1998 |
| WO | 92/11332 | 7/1992 |
| WO | 92/11333 | 7/1992 |
| WO | 94/21157 | 9/1994 |
| WO | 95/06691 | 3/1995 |
| WO | 97/07172 | 2/1997 |
| WO | 98/03601 | 1/1998 |
| WO | 99/31193 | 6/1999 |
| WO | 99/37729 | 7/1999 |

OTHER PUBLICATIONS

U.S. Appl. No. 08/886,306, filed Jul. 1, 1997.
U.S. Appl. No. 08/886,307, filed Jul. 1, 1997.
U.S. Appl. No. 08/618,707, filed Mar. 20 1996.
U.S. Appl. No. 08/976,802, filed Nov. 24, 1997.
U.S. Appl. No. 09/160,777, filed Sep. 24, 1998.
European Search Report EP 01 12 8958.

REDETACHABLE DEVICE

The invention relates to a redetachable device for a bond with an adhesive sheet, pressure-sensitively adhesive on both sides, which is redetachable without residue or destruction by extensive stretching in the bond plane, and to its use.

BACKGROUND OF THE INVENTION

Elastically or plastically highly extensible (strippable) self-adhesive tapes which can be redetached without residue or destruction by means of extensive stretching substantially within the plane of the bond are known from U.S. Pat. No. 4,024,312, DE 33 31 016, WO 92/11332, WO 92/11333, DE 42 22 849, WO 95/06691, DE 195 31 696, DE 196 26 870, DE 196 49 727, DE 196 49 728, DE 196 49 729, DE 197 08 366, DE 197 20 145, WO 99/31193, and WO 99/37729.

They are frequently employed in the form of single-sidedly or double-sidedly pressure-sensitive adhesive sheet strips (adhesive tape strips, adhesive strips), which preferably have a noriadhesive grip tab region from which the process of the detachment is initiated. Particular applications of such self-adhesive tapes can be found, inter alia, in DE 42 33 872, DE 195 11 288, U.S Pat. No. 5,507,464, U.S Pat. No. 5,672,402, and WO 94/21157. Specific embodiments are described, for example, in DE 44 25 587, DE 44 31 914, WO 97/07172, DE 196 27 400, Wo 98/03601, and DE 196 49 635, DE 197 20 526, DE 197 23 177, DE 297 23 198, DE 197 26 375, DE 197 56 084, and DE 197 56 816.

Preferred areas of use of the abovementioned adhesive sheet strips include, in particular, the residuelessly and nondestructively redetachable fixing of light to moderately heavy articles in the home, workplace, and office segments. In these applications they replace conventional fastening means, such as hooks, pins, thumbtacks, nails, screws, conventional self-adhesive tapes, and liquid adhesives, to name but a few. Key to the successful use of the abovementioned adhesive sheet strips is not only the possibility of residueless and nondestructive redetachment of bonded articles but also their quick and easy bonding, and the secure hold they provide for the envisaged period of bonding.

In accordance with the abovementioned patent documents, pressure-sensitive adhesive compositions suitable for such products include in particular those based on natural rubber/resin mixtures, synthetic rubber/resin mixtures, and acrylate copolymers. In practical application, however, it is pressure-sensitive adhesive compositions based on styrene block copolymer/resin mixtures that have taken over the market. For instance, the products tesa® Power-Strips®, tesa® Power-Strips® mini, and tesa® Poster-Strips from Beiersdorf AG, Hamburg (D), Command® Adhesive from Minnesota Mining and Manufacturing Co. Inc., St. Paul (US), and Plastofix® Formule Force 1000 from Plasto (F), all utilize a pressure-sensitive adhesive composition based on styrene block copolymer/resin mixtures.

Also sold commercially are devices made of plastic, normally bonded in the form of hooks with abovementioned double-sidedly pressure-sensitively adhesive products and redetachable without residue or destruction by extensive stretching in the bond plane.

Devices of this kind are described, inter alia, in DE 42 33 872 and WO 94/21157. DE 42 33 872, for instance, describes a redetachable self-adhesive hook equipped with a pull-release adhesive sheet (available commercially, inter alia, under the designation "tesa® Powerstrips® system hook"). Devices which can be used in this way are composed of only one plastic part or have a modular composition comprising two or more functional parts. The abovementioned system hook is composed of 2 functional parts, a baseplate and a mountable hook molding.

In the course of practical use of such devices, however, problems may occur, especially during redetachment by extensive stretching of the adhesive sheets used. At the extensional stress which occurs in this procedure, the effect of debonding is of substantial significance, in addition to a sufficiently high tensile strength. It is also necessary to ensure that the pulling of the adhesive strips takes place preferentially in the bond plane.

One possibility of circumventing the restriction just described can be found in EP 832 588, in which a redetachable self-adhesive device is provided with regions of low static friction and sliding friction. For a device to have such a construction, however, complex production technologies are needed (2-component injection molding and many more).

An additional disadvantage with the solutions known to date is that the pressure-sensitive adhesive compositions used which are able to meet the typical profile of requirements for the applications described, are restricted to a relatively large extent in the degree of freedom of the formulations and in the selection of the base materials. In many cases, high-grade modern adhesive formulations are unsuitable for the described redetachment mechanism by the bonding on stretching in the bond plane, since debonding is not sufficient. In this case the static friction and sliding friction, especially in edge regions of the bonded devices, are too high, and the adhesive strip then tends to tear, so that traceless redetachment of the device is no longer possible.

In addition, misapplications may occur for the inexperienced user if she or he fails to perform the stretching operation in one step and instead carries out stretching and release a number of times, in stages, so that in moments of release the adhesive strip may become adhesively bonded again, particularly to the edge regions of the device. This renewed bonding under simultaneous extensional stress then leads in many cases to the adhesive strips becoming torn off, as a result of additional frictional forces which occur.

Effected to a particularly great extent by these application areas are adhesive compositions which, in principle, have a tear propagation force which is much less than the tear force. Under the above-described influences of rebonding and reduced debonding such adhesive compositions are subject to very small instances of damage superficially, which owing to the low tear propagation force may lead very quickly to tearing of the adhesive strip.

Applications of these adhesive films, redetachable by extensive stretching, for decoration purposes are accumulating to an increasing extent. In such applications, visual aspects are much more significant. In these cases, particular value is placed by the users on the fact that the adhesive strips and devices (e.g., hooks) used appear visually in as unobtrusive a way as possible in relation to the decoration that is to be affixed. The prior art does not describe how a device (e.g., hooks, baseplates) is to be modified in such a way that the favored redetachment characteristics and the described optical neutrality function in combination. Thus, DE 197 29 706 describes regions which reduce static and sliding friction and which are composed of polymeric materials. However, these regions are normally not neutrally colored and/or not transparent in terms of their visual appearance, so that according to this description a desired lack of visual obtrusiveness in the user's applications cannot be achieved.

It has in fact been found that the devices or plastic parts, especially hooks, of this kind that exist have not been paid the attention appropriate to them, either in the patent literature or in practical use of the various commercially available products. Indeed, despite all of the efforts made to date, tearing occurs again and again during detachment. Quite evidently, the problem has not been fully recognized. It is found that the adhesive sheets present on the market to date, which am redetachable without residue or destruction by extensive stretching in the bond plane, do not possess a device rendering them capable of very largely retaining tear-free redetachment even under relatively disadvantageous debonding characteristics and application influences. Equally, in many cases, the desired, visually neutral appearance during application is not achieved.

It was an object of the present invention to remedy this situation and, in particular, to be able to offer the user a product of consistently high and uniform quality without him or her when using said product being disappointed in terms of the performance of a bond made using it or its subsequent parting, in particular as a result of tearing.

SUMMARY OF THE INVENTION

This object is achieved by
A redetachable self-adhesive device
a) whose reverse face is bonded with a strip of a double-sidedly adhering adhesive sheet in such a way that one end of the adhesive sheet projects beyond the device as a grip tab,
b) the adhesive sheet is such that the bond made with it is redetachable by stretching pulling on the grip tab of the strip in the direction of the bond plane, wherein
c) on its reverse face the device, in the region situated against the grip tab of the adhesive sheet strip or and also partly against the free adhesive composition, has an average roughness $R_a$ of 0.4–25 µm.

In a preferred embodiment, the region exhibiting the average roughness $R_a$ has a depth of roughness of 1–150 µm, in particular 2–100 µm, The region having the average roughness $R_a$ preferably at least corresponds or exceeds in its width the width of the strip, and in its depth measures 0.5–20 µm, especially 0.5–15 µm.

Adhesive Sheets

Adhesive sheets to be protected in accordance with the invention against tears include in particular those corresponding to U.S. Pat. No. 4,024,312, DE 33 31 016, WO 92/11333, DE 42 22 849, WO 95/06691, DE 196 26 870, DE 196 49 727, DE 196 49 728, DE 196 49 729, and DE 197 08 366 which utilize pressure-sensitive adhesive compositions based on elastomer/resin mixtures. In particular, the adhesive sheets used in accordance with the invention utilize pressure-sensitive adhesive compositions based on polymeric dienes, such as natural rubber, synthetic polyisoprene, and polybutadiene, for example. Moreover, these adhesive sheets utilize pressure-sensitive adhesive compositions based on styrene block copolymers. Preferred styrene block copolymers include those containing elastomer blocks based on 1,3-dienes, such as polyisoprene, polybutadiene, isoprene-butadiene copolymers, and the partly or fully hydrogenated analogs corresponding to the aforementioned systems. Furthermore, these adhesive sheets utilize pressure-sensitive adhesive compositions based on random copolymers of conjugated dienes and further polymerizable compounds, such as styrene-butadiene copolymers or acid-functionalized styrene-butadiene copolymers, to name but a few. Additionally, adhesive sheets to be protected in accordance with the invention against tears utilize pressure-sensitive adhesive compositions based on polyolefinic elastomers. A further possibility for use in accordance with the invention are adhesive sheets with pressure-sensitive adhesive compositions based on mixtures of abovementioned elastomers and also based on blends of abovementioned elastomers with further polymers.

Plastic Part (Device)

Devices of the invention generally serve to accommodate one side of the adhesive sheet, whose other side is bonded to the selected substrate. A wide variety of different adapters, including hook bodies, may be placed on such devices in the function of a baseplate, for example. However, it is also possible for the device itself to be designed as a hook or the like, i.e., to have a hooklike mounting means on the front face, for example. In order to generate a high bond strength, the area of the device—and mandatorily not the entire molding construction—to which the adhesive sheet is applied is composed in particular of a material having an adhesion to the adhesive sheet that is sufficient for the case in hand. Here, advantageously, suitable moldings include injection molding compositions which are composed of PMMA, POM, PC, polyamide, and polyester, and especially polystyrene and/or styrene copolymers, and/or mixtures of such components.

At at least one region of the reverse face, the devices of the invention are roughened. Surprisingly, this effect occurs particularly with injection molding compounds on which adhesive strips that are to be preferably used exhibit a desirably good adhesion. Accordingly, it becomes possible to implement a modification of this kind, providing security against tears, without complex use of, for example, 2-component injection molding technologies, as would be necessary in accordance with EP 832 588.

With the devices of the invention, the inventive modifications made remain material-neutral in their visual appearance; in other words, in the eye of the user, the modifications do not bring about any visually unwanted changes in color and/or transparency of the materials used. Accordingly, it is also possible to provide colorless transparent devices, for example, with correspondingly described modifications, which do not appear disruptively when viewed in the application.

The redetachability of a device of the invention may be improved still further by additionally providing spacers, in particular in accordance with DE 196 37 223 (=U.S. Pat. No. 5,928,747). This permits tear-free redetachment even under very high forces acting perpendicularly to the bond plane (e.g., excessive applied pressing force during parting of the adhesive bond).

The devices of the invention may be produced either by corresponding tool modification directly in the injection molding operation, or in a subsequent workstep by etching, grinding, embossing or spark erosion, for example.

The devices of the invention develop the prior art in accordance with EP 832 588 further in a different, hitherto unexplored direction. EP 832 588 teaches how a plate or similar devices may be equipped in such a way that over their peel edge, by way of which an adhesive sheet strip is debonded by stretching pulling, the peel angle ought approximately to be a right angle, in particular an angle of 45°–135° to the bond plane; cf., e.g., claim 18 therein. This stripping at a 90° angle is intended in particular for applications where there is not sufficient space to carry out stripping "normally", along the wall for instance.

To improve or enable this is not the concern of the present invention. The objective here, rather, was to reduce the tendency toward tearing during "normal" stripping. As laid out in the introduction, this tendency toward tearing continues to be a problem. And the prior art gives little incitement, for instance spacers, for solving this problem. More extensive knowledge or incitement, however, are not offered by the prior art in this respect.

Further embodiments of the invention are shown by the devices depicted by way of example in the figures, which are not intended to represent any unnecessary restriction. In the drawing,

BRIEF DESCRIPTION OF THE DRAWINGS

In detail, figure 1 shows a device (1). The reverse face (2) of the device (1) is used for sticking on an adhesive sheet strip (5), the regions (3A) and (3B) of this reverse face (2) which lie against the grip tab (6) of the adhesive sheet strip (5) are roughened. The depth (W) of the roughened area is depicted and extends in the form shown to approximately the "inner" end of the grip tab (6), though may also readily extend further into the adhesive area, i.e., up to the point where the adhesive sheet strip (5) bonds to the device (1) and is no longer covered by film (7B). Since the user is able to stick the adhesive sheet strip (5) onto the device (1) in such a way that the grip tab (6) is able to protrude at either one end or other end, both regions (3A) and (3B) are roughened. This prevents the user bonding the adhesive sheet strips (5) "wrongly"; i.e., in such a way that the grip tab (6) not roughened protrudes. Accordingly, the user does not need to consult use instructions or the like as to how he or she should stick on the adhesive sheet strip (5); instead, he or she always sticks it on "correctly". And at the same time he or she has the further advantage that toward the end of the stripping operation the adhesive sheet strip (5) parts more readily from the bond and so also tends less toward tears at the end of stripping. Indeed, it is particularly at the end of stripping that the tendency toward tearing goes up, since the force with which the user presses on the article in order to hold it is exerted on an area which is becoming smaller and smaller as stripping progresses—a phenomenon which may also be countered by means of spacers.

In the region of the grip tab (6), on the reverse face (2) of the device (1), there is an edge (4) below which stripping takes place. Similarly, the corresponding edge (4') would be that below which stripping would take place were the adhesive sheet strip to be stuck on "the other way round", i.e., in such a way that its grip tab (6) projects beyond this edge (4').

Films (7A, 7B) cover the grip tab (6) in such a way that said tab is not adhesive and can therefore be gripped effectively and let go of again later.

Figure 2:
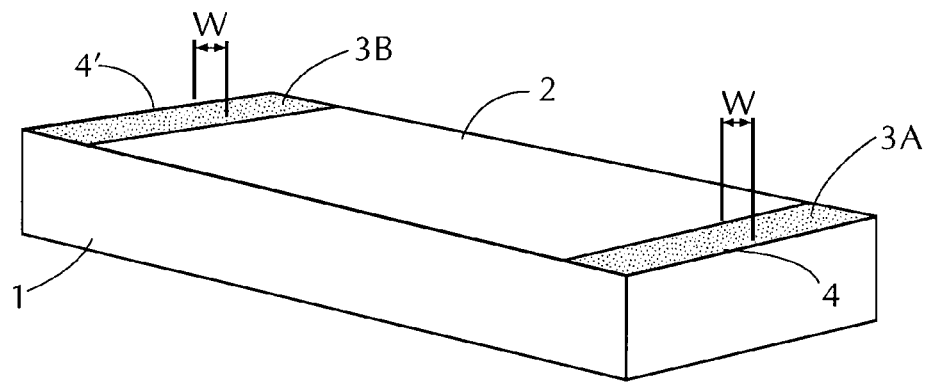

FIG. 2 shows the device (1) without an adhesive sheet strip (5) stuck on. Here, the roughened regions (3A, 3B) are shown hatched.

Figure 3:
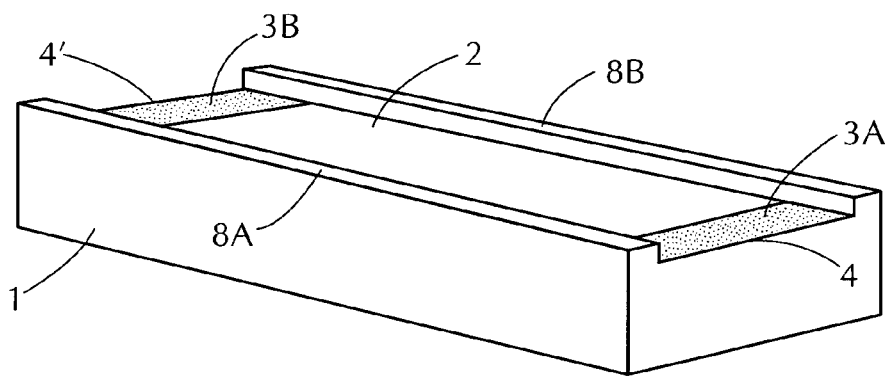
FIG. 3 shows an oblique side elevation of another device.

FIG. 3 depicts another embodiment in which the device (1) has a reverse face (2) which serves to accommodate an adhesive sheet strip (not shown) and which has regions (3A) and (3B) roughened at both ends. Additionally, the device (1) has spacers (8A, 8B).

Figure 4:
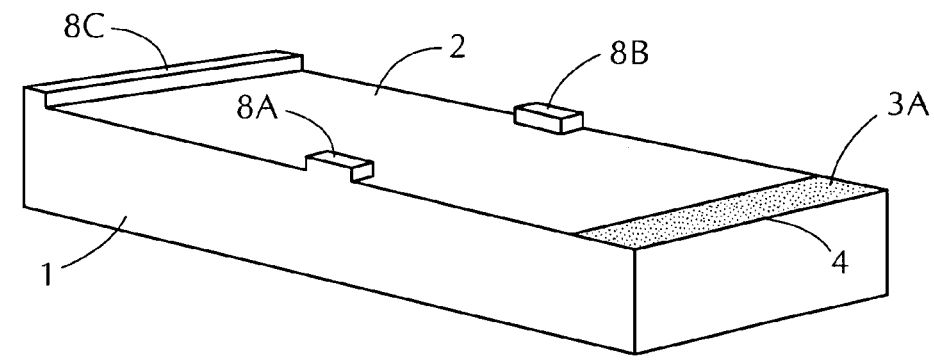
FIG. 4 shows an oblique side elevation of a further device.

FIG. 4 shows a further preferred embodiment of a device (1) having a reverse face (2) which serves to accommodate an adhesive sheet strip (not shown) and which, in accordance with FIG. 3, is equipped with spacers (8A, 8B, 8C).

Figure 1:
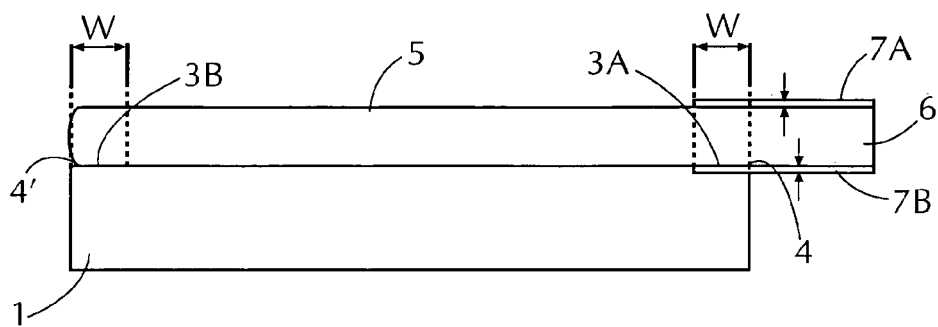
FIG. 1 shows a side elevation of a device of the invention, with an adhesive sheet strip stuck on, FIG. 2 shows an oblique side elevation in accordance with FIG. 1.

Otherwise, the roughened regions (3A, 3B) are as in accordance with FIG. 1; only in accordance with FIG. 4 is only one such region (3A) provided, since here, owing to the simultaneous limiting function of the spacers (8A, 8B, 8C), the adhesive sheet strip (5) can be stuck only in one version, namely such that its grip tab (6) projects beyond the region (3A) and hence beyond the edge (4).

The spacers (8A, 8B, 8C) are designed as ridges or segments whose height is approximately half the thickness of the adhesive sheet strip (5) to be applied, the distance between the spacers (8A and 8B) being chosen such that the adhesive sheet strip (5) can easily be placed widthways in between them.

In all of the examples below, testing was carried out with single-layer adhesive sheets which are in accordance with the definition and have the following formulation:

50 parts ESCOREZ 5600® (a hydrogenated tackifier resin from Exxon Chemical), 35 parts KRATON® G RP 6919 (a block copolymer of styrene-ethylene/butylenes-styrene, having isoprene side chains attached to the ethylenel/butylenes midblock, i.e., $(SEB)_2I_2$, obtained from Kraton), 15 parts Kraton G 1657 (a clear linear triblock copolymer based on styrene and ethylene-butylene, available from Kraton), 0.5 part IRGANOX® 1010 (a sterically hindered antioxidant available from Ciba).

On the abovementioned formulation in a thickness of 650 µm, a tensile strength of 8.3 MPa and an elongation at break of 750% were measured.

EXAMPLE A

Glass-clear, colorlessly transparent plates (length× breadth=50×25 mm) having a thickness of 1.25+/−0.25 mm were injection molded from polystyrene (PS 158 K-BASF and Empera 123-BP Chemicals) for which a roughness was introduced directly in the injection molding process. The roughened region (3A in FIG. 2) is as wide as the plate, that is to say 20 mm, and is 2 mm deep. Using adhesive strips redetachable without residue by stretching (for formulations see above) (L×B=50×20 mm), provided at one end on both sides with a grippable, nonadhesive region (by coverage with a siliconized 23 µm PET film) (L×B=14×20 mm), these plates were bonded to panes of window glass such that the grippable region reaches a maximum of 1 mm into the joint. For this purpose, the adhesive strip (its upper face lined with release paper) was placed onto the pane of glass and pressed on by rolling (10 m/s) over it 6 times using a 2 kg pressing roller. Following removal of the release paper, the above-described polystyrene plates were bonded by applied pressure (10 s, 100 N), acting uniformly and vertically on the entire adhesive composition, in such a way that the entire adhesive region of the adhesive strip was covered.

Specimens prepared in this way were subjected to storage at 40° C. for 72 h. After reconditioning at 23° C. for 24 h, the specimens were assessed by extracting the adhesive strips stretchingly from the joint by hand, by pulling on the nonadhesive grip region (the maximum angle to the bond surface during detachment was 5°–10° C., the typical detachment speed approximately 10 cm/s). The assessment criterion was whether the adhesive strip could be detached in the manner described without residue or tearing.

Result

| Plates* | Tear frequency (%) |
|---|---|
| 2 without roughened region | 61 |
| 2a with roughened region | 28 |

*Technical data relating to the roughened region:

| Plate | [2]Average roughness $R_a$ | [2]Averaged depth of roughness $R_z$ |
|---|---|---|
| 2a | 3.1 µm | 20.0 µm |

[2]set at the injection mold in accordance with DIN 4768

Accordingly, the tear frequency is significantly reduced.

EXAMPLE B

In accordance with example A, plates were produced by injection molding, except that in this case four different roughnesses were set.

Bonding, conditioning, and assessment of the specimens took place in accordance with example A.

Result

| Specimen | [2]$R_a$ | [2]$R_z$ | Tear frequency (%) |
|---|---|---|---|
| 2a.1 | 0.4 | 1.6 | 40 |
| 2a | 3.1 | 20.0 | 28 |
| 2a.2 | 18.0 | 85.0 | 17 |
| 2a.3 | 30.0 | 176.0 | 43 |

[2]set at the injection mold in accordance with DIN 4768

The change in the roughness features selected here controls the frequency of tearing. It is clearly indicated in this example that precision optimization of the determinant roughness features may be advantageous in certain applications.

What is claimed is:

1. A redetachable self-adhesive device, in the form of a structure
   a) comprising a surface which is bonded to one side of a double-sided adhesive strip with at least one end of the adhesive strip projecting beyond at least one edge of said surface as a grip tab,
   b) the adhesive strip being redetachable by pulling on the grip tab of the strip to stretch the strip in the direction of a plane formed between the strip and the surface it is bonded to,
   wherein
   c) said surface, in the area immediately adjacent to said at least one end of the adhesive strip projecting as a grip tab, has an average roughness $R_a$ of 2–20 µm and has an average depth of roughness $R_z$ of 2–100 µm.

2. The device as claimed in claim 1, wherein the area of the surface having the average roughness $R_a$ is produced together with the device by injection molding, or wherein the method of production of said area is selected from the group consisting of etching, grinding, embossing or spark erosion.

3. The device as claimed in claim 1, wherein said surface has two opposite edges wherein the areas of said surface immediately adjacent to said two opposite edges of said surface have said average roughness $R_a$.

4. The device as claimed in claim 1, further comprising spacers on the surface of the device to which the adhesive strip is bonded wherein the heights of said spacers are less than the thickness of the adhesive strip.

5. The device as claimed in claim 1, wherein the double-sided adhesive strip is elastically or plastically extensible with or without a carrier in between the two sides of said double-sided adhesive strip.

6. The device as claimed in claim 1, wherein the adhesion of the double-sided adhesive strip is less than the cohesion, the adhesion largely disappears when the strip is extended, and the ratio of peel force to tear load is at least 1:2.0, the double-sided adhesive strip being based on thermoplastic rubber and tackifying resins.

7. The device as claimed in claim 1, wherein the side of the double-sided adhesive strip opposite the side that is bonded to the surface of the device is lined with a release laminate or a release film.

8. The device as claimed in claim 1, wherein said device comprises a hook or latching projection.

9. The device of claim 7, wherein said release laminate or release film is a siliconized release paper.

* * * * *